United States Patent
Müssig et al.

(10) Patent No.: US 8,048,514 B2
(45) Date of Patent: Nov. 1, 2011

(54) FILM MADE OF POLYPROPYLENE, USE THEREOF, AND METHOD FOR THE PRODUCTION OF THE FILM

(75) Inventors: Bernhard Müssig, Seevetal (DE); Ilse Rodewald, Hamburg (DE); Uwe Michel, Berlin (DE)

(73) Assignee: TESA SE, Hamburg (DE)

( * ) Notice: Subject to any disclaimer, the term of this patent is extended or adjusted under 35 U.S.C. 154(b) by 0 days.

(21) Appl. No.: 12/863,930

(22) PCT Filed: Jan. 12, 2009

(86) PCT No.: PCT/EP2009/050276
§ 371 (c)(1),
(2), (4) Date: Oct. 19, 2010

(87) PCT Pub. No.: WO2009/092643
PCT Pub. Date: Jul. 30, 2009

(65) Prior Publication Data
US 2011/0020629 A1   Jan. 27, 2011

(30) Foreign Application Priority Data
Jan. 22, 2008   (DE) .................. 10 2008 005 565

(51) Int. Cl.
*A01K 1/015* (2006.01)
(52) U.S. Cl. ............... 428/221; 428/299.7; 264/129
(58) Field of Classification Search .......... 428/212, 428/220, 229.1, 343, 298.1, 299.4, 299.7, 428/221; 264/129
See application file for complete search history.

(56) References Cited

U.S. PATENT DOCUMENTS

| | | | | |
|---|---|---|---|---|
| 3,864,903 A * | 2/1975 | Maki | ............... | 57/260 |
| 3,957,573 A * | 5/1976 | Miyamoto et al. | ............ | 162/102 |
| 5,430,119 A * | 7/1995 | Kouya et al. | ............... | 526/348.1 |
| 6,511,742 B1 * | 1/2003 | Mussig et al. | ................ | 428/343 |
| 6,794,003 B2 * | 9/2004 | Shimano et al. | ............. | 428/41.8 |
| 6,824,863 B1 * | 11/2004 | Kitayama et al. | .......... | 428/299.7 |
| 2003/0096108 A1* | 5/2003 | Mussig et al. | ................ | 428/343 |
| 2011/0014449 A1* | 1/2011 | Mussig et al. | ................ | 428/220 |
| 2011/0014450 A1* | 1/2011 | Michel et al. | ................. | 428/220 |
| 2011/0020629 A1* | 1/2011 | Mussig et al. | ............. | 428/299.1 |
| 2011/0027552 A1* | 2/2011 | Rodewald et al. | ............ | 428/212 |

FOREIGN PATENT DOCUMENTS

| | | |
|---|---|---|
| DE | 10048209 A1 | 4/2001 |
| EP | 0255866 A | 2/1988 |
| EP | 1829948 A | 9/2007 |

OTHER PUBLICATIONS

International Search Report Dated Apr. 6, 2009.

* cited by examiner

*Primary Examiner* — N. Edwards
(74) *Attorney, Agent, or Firm* — Norris McLaughlin & Marcus, PA

(57) ABSTRACT

The invention relates to a film, in particular for an adhesive tape, characterized in that the film contains at least one homopolymer, copolymer, or terpolymer of the propylene and fibers and is monoaxially stretched in the longitudinal direction, wherein the elongation ratio is preferably at least 1:8 and particularly preferably at least 1:9.5.

10 Claims, No Drawings

FILM MADE OF POLYPROPYLENE, USE THEREOF, AND METHOD FOR THE PRODUCTION OF THE FILM

This application is a 371 application of PCT/EP2009/050276 filed Jan. 12, 2009, which claims priority to the German application DE 10 2008 005 565.4 filed Jan. 22, 2008.

The invention relates to a film of polypropylene, to its use, and to methods for producing the film.

Films with a high modulus and high tensile strength are typically obtained by orienting extruded flat films of partially crystalline thermoplastics. The orientation in question is predominantly biaxial, though in exceptional cases the films are oriented in longitudinal direction only for the purpose of further increasing the longitudinal tensile strength. Both commercially customary biaxially and monoaxially oriented films based on polypropylene, however, unlike unoriented films from the blown film or cast film process, feature low tear propagation resistance in transverse direction.

In operational practice, in the case of damaged edges on the film or on the film carrier in an adhesive tape (as a result of blunt blades during slitting or later unintended damage to the slit edge), this makes the film likely to suffer tearing or be torn off under tensile load. Unoriented films, in contrast, have high tear propagation resistance, but low modulus and tensile strengths.

Where requirements regarding tensile strength and tear propagation resistance are exacting, films and adhesive tapes are reinforced with filaments or with meshes of filaments made of glass or plastic. From an equipment standpoint, the production of such filament adhesive tapes is very involved, and hence expensive and susceptible to faults. It requires not only the base film but also the filaments and laminating adhesive (or an additional coating of pressure-sensitive adhesive), which makes the products more expensive still. Other disadvantages of such filament adhesive tapes are low crease fracture resistance, high thickness, untidy slit edges, and lack of weldability and recyclability. The production of an adhesive tape of this kind is described in U.S. Pat. No. 4,454,192 A1, for example.

DE 21 04 817 A1 describes a method for producing an adhesive tape carrier from polyolefin (polyethylene or polypropylene) for the production of adhesive tapes. Through orientation in longitudinal direction it is said to be possible to attain a tensile strength in longitudinal direction of 320 N/mm$^2$ (according to claim 2; no example present). Draw ratio and attained stress at 10% elongation are not disclosed.

Subject matter of EP 0 255 866 A1 is a polypropylene film oriented biaxially or in longitudinal direction. The addition of elastomeric components increases the tensile impact toughness in transverse direction. This measure, however, results in a deterioration in the tensile strength and in the tear propagation resistance in transverse direction. The draw ratio in longitudinal direction is 1:5.5 to 1:7. Tensile strengths of 12 to 355 N/mm$^2$ are attained. The tensile stresses for an elongation of 10% are unknown.

At the end of the 1980s, the company Beiersdorf (Hamburg, Germany) marketed a tear-open strip which exhibits a reduced tendency to be torn off. It comprised a carrier film oriented in longitudinal direction from the company NOPI (Harrislee, Germany), which was produced by coextruding base materials of differing toughnesses, and had a draw ratio of 1:7.5. In accordance with the principle of impact modification, the tough outer coextrusion layer reduces the formation of microtears when the product is slit with sharp blades. However, it does not prevent tears caused by subsequently damaged edges (for example, when the roll is transported or applied to the carton), which requires a considerably higher tear propagation resistance. The outer layer contains 60% by weight of polypropylene copolymer, with about 5% by weight of ethylene, and 40% by weight of SBS rubber to increase the toughness, which impairs the light stability and leads in particular to reduced tensile strength (160 N/mm$^2$) and reduced stress at 10% elongation (70 N/mm$^2$) of the film in longitudinal direction. The less tough main layer contains 92% by weight of the polypropylene copolymer and 8% by weight of the SBS rubber. The SBS rubber reduces the tear propagation resistance of a single-layer film of pure polypropylene copolymer with the same draw ratio from around 240 N/mm to 70 N/mm.

DE 44 02 444 A1 relates to an adhesive tape which possesses tensile strength and is based on monoaxially oriented polyethylene. It is possible in certain respects to achieve mechanical properties that are similar to those of corresponding polypropylene products. Polyethylene, however, has a significantly lower heat stability than PP, which is manifested disadvantageously both when the adhesive tape is produced (drying of layers of adhesive or other layers in the oven) and in the context of its subsequent packaging applications as a grip tape, adhesive carton sealing tape, tear-open strip or carton reinforcement strip. The adhesive tapes on the cartons often become hot, on passage through printing machines or after having been filled with hot goods (comestibles, for example), for example. A further disadvantage of polyethylene films (including oriented PE films) is the force at 10% elongation, which is markedly lower by comparison with polypropylene films. As a result of the high elongation for a given force, grip tapes or adhesive carton sealing tapes that are produced from such films tend to detach under tensile load, and carton reinforcement strips are unable to prevent cartons being torn into. The draw ratio in longitudinal direction and stresses at 10% elongation are not disclosed. Tensile strengths of 102 to 377 N/mm$^2$ are attained.

The inventions described above have certainly found applications, but the tensile strengths and tear propagation resistances that are achievable are not nearly those of filament adhesive tapes. Consequently there have been attempts to avoid the involved application of numerous filament threads and to give the oriented films filament-like properties by virtue of longitudinal structures, a description being given below.

U.S. Pat. No. 5,145,544 A1 and U.S. Pat. No. 5,173,141 A1 describe an adhesive tape comprising monoaxially oriented film which has a rib structure for reinforcement, the ribs partly protruding from the surface and partly being embedded in the film surface. Notch joints are formed between film and ribs. The invention achieves a high tear strength in transverse direction, but the tensile strength and elongatability are still in need of improvement. The essential deficiency, however, is that a film in accordance with that invention cannot be produced on the production scale. The reason for this is the poor orientability in typical width, and also an extremely poor flatness, meaning that the possibility of coating the film with pressure-sensitive adhesive is no longer ensured. At high widths, moreover, there is a further deterioration in flatness as a result of nonuniform and inadequate adhesion (as a result of the film not lying flat) on the drawing rolls in the subsequent orientation procedure. In the case of manufacture in typical production width, the film in the middle region is held on the drawing rolls in transverse direction, the results being that the rib structure is altered by orientation, and the entire product quality becomes inhomogeneous. A further disadvantage is that a calender must be used in order to impart at least 50% embedding of the ribs; a calender involves very high capital expenditure and makes the process much more complicated. The rib structure on the surface also leads readily to coating defects when applying release agents or primers during the further processing procedure to form adhesive tapes, since the application techniques for films require a smooth surface. Imprints of reinforcing filaments or rib structures in the surface of films are deleterious for the printing process, which requires smooth surfaces. Particularly in the case of utilization of the film of the invention for an adhesive packaging tape, printability is for customers an important criterion.

U.S. Pat. No. 5,145,544 A1 discloses a draw ratio of 1:7 and tensile strengths of 157 to 177 N/mm$^2$; stresses at 10% elongation are not ascertained. U.S. Pat. No. 5,173,141 A1 discloses draw ratios of 1:6.1 to 1:7 and tensile strengths of up to 245 N/mm$^2$; stresses at 10% elongation are not ascertained.

EP 1 101 808 A1 attempts to overcome the stated disadvantages by inserting the rib structures into the interior of the film. The film has plane-parallel outer faces and comprises at least two coextruded layers of different compositions, the interface of which is not flat, the cross section of the boundary profile instead being non-linear, and this profile continuing in laminar fashion longitudinally. The special internal structure of the film derives from the thickness of a layer varying irregularly or periodically in transverse direction, and the second layer compensating the fluctuations in thickness in such a way that the overall thickness is substantially constant. All of the stated inventions exhibit improved tensile strength and elasticity modulus in longitudinal direction relative to a standard adhesive tape film. The draw ratios are between 1:6.7 and 1:8.7. As far as tensile strengths are concerned, 202 to 231 N/mm$^2$, and stresses at 10% elongation of 103 to 147 N/mm$^2$, are achieved.

None of these inventions has been implemented industrially, since the production methods are very involved. Furthermore, they fall far short of matching the properties of products with glass or polyester filaments.

It is an object of the invention to provide a film, in particular for an adhesive tape, which does not have the stated disadvantages of the prior-art films.

This object is achieved by means of a film of the kind characterized more closely in the main claim. The dependent claims describe advantageous embodiments of the invention. Further encompassed by the concept of the invention are the use of the film of the invention, and a production method.

The invention accordingly provides a film which comprises at least one homopolymer, copolymer or terpolymer of propylene and comprises fibers and is oriented monoaxially in longitudinal direction, the draw ratio being preferably at least 1:8 and more preferably at least 1:9.5, so producing an extremely high tear propagation resistance in transverse direction.

The film can be produced by the relatively simple method for PP films oriented monoaxially in longitudinal direction (machine direction), thereby making it unnecessary to rely on the involved methods for producing carriers with filaments for filament adhesive tapes.

The film has typical properties of fiber-reinforced carriers for filament adhesive tapes, such as an extremely high tear propagation resistance in transverse direction, increased moduli and high tensile strengths. Specifically in comparison with the most frequently used PP films for packaging and adhesive tapes, comprising BOPP (biaxially oriented polypropylene film), which possess low moduli and extremely low tear propagation resistance, the superiority is manifested.

The films of the invention, and adhesive tapes produced from them, are superior in transparency to filament adhesive tape carriers and filament adhesive tapes, respectively, since the individual fibers are embedded without air inclusions, unlike filament bundles. The adhesive tapes produced with the films of the invention, moreover, have a higher stiffness, which reduces the risk of incorrect adhesive bonds on dispending in automatic application. A further advantage over the known filament adhesive tapes lies in the lower thickness, which allows larger running lengths of the rolls for a given maximum roll diameter, a factor which, for the user, reduces the frequency of roll changeover.

In one preferred embodiment the orientation of the film is such that the transverse tensile impact toughness becomes very small. For certain applications in certain circumstances this may be a disadvantage, but for applications such as reinforcement of die cuts on cartons it has been found to be advantageous. A low elongation as a result of high orientation in the longitudinal direction prevents the tearing of cartonboard (for example at punched-out carry handles). Films of this kind have a tendency toward fibrillation in the longitudinal direction, and this, in the event of edge damage, prevents tear propagation in transverse direction, by diverting the crack into the longitudinal direction, and evidently in this way enhances the tear propagation resistance.

In order to attain high tensile strengths, high stresses at 1% and 10% elongation, and high tear propagation resistance, the conditions in the drawing operation ought to be selected such that the draw ratio is the maximum technically achievable ratio for the particular film. In accordance with the invention the draw ratio in longitudinal direction is at least 1:8, preferably at least 1:9.5.

A draw ratio of, for example, 1:6 indicates that a primary film section 1 m in length is formed into a section of the oriented film with a length of 6 m. The draw ratio is often also identified as a ratio of the linear speed prior to orientation to the linear speed after orientation.

In one preferred embodiment of the invention the properties of the film are as follows:
  a tensile strength in longitudinal direction (machine direction) of at least 300 N/mm$^2$, preferably at least 350 N/mm$^2$, more preferably at least 400 N/mm$^2$,
  in longitudinal direction a stress at 1% elongation of at least 20 N/mm$^2$, preferably at least 40 N/mm$^2$,
  in longitudinal direction a stress at 10% elongation of at least 170 N/mm$^2$, preferably at least 200 N/mm$^2$, more preferably at least 300 N/mm$^2$, and/or
  in transverse direction a tear propagation resistance of at least 1700 N/mm, preferably at least 3500 N/mm.

The film is preferably not tearable when the tear propagation resistance is tested in transverse direction.

For the calculation of strength figures, the width-related force values are divided by the thickness. Where the strength values are determined on the adhesive tape, the thickness used as a basis is not the total thickness of the adhesive tape, but only that of the carrier film.

The thickness of the film is preferably between 25 and 200 μm, more preferably between 40 and 140 μm, very preferably between 50 and 90 μm.

Carrier film preferably has a failure criterion of 2 or 3 and more preferably of 3. The failure criterion is explained comprehensively in the Test Methods section.

Suitable base film materials for producing the film are commercially available polypropylene homopolymers, polypropylene copolymers, and polypropylene terpolymers, including the block (impact) polymers and random polymers.

The melt indices of the specified polymers must lie within the range suitable for flat film extrusion. This range ought to be between 0.3 and 15 g/10 min, preferably in the region of 0.8 and 5 g/10 min (measured at 230° C./2.16 kg).

The polypropylene is preferably of predominantly isotactic construction. The flexural modulus ought to be at least 1000 MPa, preferably at least 1500 MPa, more preferably at least 2000 MPa.

In accordance with another advantageous variant of the invention, the film has a coextrusion layer on at least one of the two outer faces.

The coextrusion layer preferably comprises a polyolefin with a lower crystallinity than a predominantly isotactic polypropylene homopolymer, which generally has a crystallite melting point of about 160 to 163° C. It is particularly preferred in the coextrusion layer to use polypropylene polymers or ethylene-containing polymers having a crystallite melting point of below 150° C., preferably below 140° C.

Fibers in accordance with the invention are staple fibers and not continuous filaments or nanotubes (for example, MWCNT (multiwall carbon nanotubes)); the fibers are substantially fibers within the meaning of ISO 6355.

According to the prior art, filament bundles laminated to films are used for filament adhesive tapes, and nanotubes tend to form dusts on processing, these dusts being classed very critically from the standpoint of occupational hygiene.

Fibers suitable in an inventive sense are those as described, for example, in the "Fibers" chapter in "Ullmann's Encyclopedia of Industrial Chemistry (2002 edition from Wiley-VCH Verlag, Article Online Posting Date Jun. 15, 2000), provided they do not melt or decompose on processing (i.e., for example, polyethylene fibers).

Particularly suitable are fibers with a high elasticity modulus, such as hemp, sisal, flax, banana fibers, coconut, pineapple, aramid, polyarylate, glass, silicon carbide, aluminum silicate, basalt or carbon, more particularly E-glass and textile glass.

The fibers are preferably provided with a size (coupling agent) in order to optimize attachment to the polymer matrix.

Base materials for sizes are native starch, modified starches, sodium carboxymethylcellulose, polyvinyl alcohol, polyacrylates, galactomannans (guar gum and locust bean gum), and also, for specialty applications, water-dispersible polyesters, vinyl acetate copolymers, glue, gelatin, and proteins. The sizes may further comprise fats, waxes, sulfonated tallow or sulfonated oil.

The fiber diameter is preferably in the range from 4 to 30 μm, more particularly between 9 and 16 μm. The length of the fibers is preferably at least 100, more preferably at least 300 μm.

The fraction of fibers in the film is preferably 0.5% to 10% by weight, more particularly 3% to 6% by weight.

The polymers in the film may be used in pure form or in a blend with additives such as antioxidants, light stabilizers, antiblocking agents, lubricants, and processing assistants, fillers, dyes, pigments, blowing agents and/or nucleating agents.

The film is preferably nucleated.

The nucleating agent can be added in pure form or preferably in the form of a master batch, or the polypropylene is self-nucleating.

Nucleating agents contemplated are all those that are suitable for polypropylene (α or β crystals). These include organic nucleating agents such as, for example, benzoates, phosphates or sorbitol derivatives. Nucleating agents of this kind are described for example in the section "9.1. Nucleating Agents" in Ullmann's Encyclopedia of Industrial Chemistry (2002 edition from Wiley-VCH Verlag, Article Online Posting Date Jun. 15, 2000) or in the examples of US 2003/195300 A1. Another particularly suitable method is the use of a semicrystalline branched or coupled polymeric nucleating agent, as is described in US 2003/195300 A1, an example being a polypropylene modified with 4,4'-oxydibenzenesulfonyl azide.

The carrier film can be produced by calendering, flat film extrusion or blown film extrusion, and, preferably, by flat film extrusion (also called T-die or cast process) with subsequent orientation in longitudinal direction.

One particularly advantageous method for producing a film of the invention includes the following steps:
optionally mixing the polypropylene with the fibers in an extruder,
optionally granulating the compounded formulation,
melting the compounded formulation in an extruder,
discharging and shaping the melt by means of a die,
cooling the melt to form a film, preferably on a chill roll, by the cast film extrusion process,
optionally heating the film to a suitable drawing temperature by means of heated rolls,
orienting the film in a short gap in longitudinal direction,
optionally carrying out coating with pressure-sensitive adhesive, unless a layer of pressure-sensitive adhesive has already been applied in the extrusion process,
optionally converting to form rolls.

The purpose of the last steps is to produce an adhesive tape from the film.

The adhesive may be applied during the actual extrusion of the film, by coextruding the adhesive with the film. In accordance with one variant, the adhesive can be applied later, in a separate step.

Mixing may take place separately in an extruder or kneading apparatus, or, using suitable mixing elements, in the film extruder. It is preferred to supply a mixture of polypropylene, the fiber master batch, and, optionally, the additives to the film extruder.

The film may be single-layer or multilayer. As a result of coextrusion it is possible to avoid deposition when the film is being oriented, and to avoid problems when coating with release, primer or adhesive.

The films may be modified by lamination, embossing or radiation treatment, or may be given surface treatments. These are, for example, the promotion of adhesion by corona, flame, fluoro or plasma treatment, or primer coatings of solutions or dispersions, or liquid, radiation-curable materials.

Further possible coatings are printed coatings and nonstick coatings, examples being those of crosslinked silicones, acrylates (Primal® 205, for example), polymers with vinylidene chloride or vinyl chloride as monomer, or stearyl compounds such as polyvinyl stearyl carbamate or chromium stearate complexes (Quilon® C, for example) or reaction products of maleic anhydride copolymers and stearylamine.

Without coatings of adhesive, the film of the invention can be used for packaging or bundling applications. The joining of the ends may take place, as for conventional strapping tapes for cartons, boxes or crates made of iron, polyethylene or polypropylene, by means of metal clips or welding.

The film of the invention is applied preferably in the form of an adhesive tape. By adhesive tape in this invention is meant a film having a self-adhesive or heat-activatable layer of adhesive. The adhesives in question, however, are preferably not sealable adhesives, but instead pressure-sensitive adhesives (PSAs). For the adhesive tape application, the film is coated on one side with PSA in the form of a solution or dispersion or in 100% form (melt, for example) or by coextrusion with the film. The adhesive layer or layers can be crosslinked by means of heat or high-energy radiation and can where necessary be lined with release film or release paper. Particularly suitable PSAs are those based on acrylate, natural rubber, thermoplastic styrene block copolymer or silicone.

The general expression "adhesive tape" encompasses for the purposes of this invention all sheetlike structures, such as two-dimensionally extended films or film sections, tapes with extended length and limited width, tape sections and the like, and also, lastly, die cuts or labels.

For the purpose of optimizing the properties it is possible for the self-adhesive composition employed to be blended with one or more additives such as tackifiers (resins), plasticizers, fillers, pigments, UV absorbers, light stabilizers, aging inhibitors, crosslinking agents, crosslinking promoters or elastomers.

Suitable elastomers for blending are, for example, EPDM rubber or EPM rubber, polyisobutylene, butyl rubber, ethylene-vinyl acetate, hydrogenated block copolymers of dienes (for example, through hydrogenation of SBR, cSBR, BAN, NBR, SBS, SIS or IR; such polymers are known, for example, as SEPS and SEBS), or acrylate copolymers such as ACM.

Examples of tackifiers are hydrocarbon resins (from unsaturated $C_5$ or $C_7$ monomers, for example), terpene-phenolic resins, terpene resins from raw materials such as α- or β-pinene, aromatic resins such as coumarone-indene resins, or resins of styrene or α-methylstyrene, such as rosin and its derivatives, such as disproportionated, dimerized or esterified resins, in which case glycols, glycerol or pentaerythritol may be used. Particularly suitable are aging-stable resins without an olefinic double bond, such as hydrogenated resins, for example.

Fillers and pigments such as carbon black, titanium dioxide, calcium carbonate, zinc carbonate, zinc oxide, silicates or silica can be used.

Suitable UV absorbers, light stabilizers, and aging inhibitors for the adhesives are the same as those recited in this specification for the stabilization of the film.

Examples of suitable plasticizers include aliphatic, cycloaliphatic, and aromatic mineral oils, diesters or polyesters of phthalic acid, trimellitic acid or adipic acid, liquid rubbers (nitrile rubbers or polyisoprene rubbers, for example), liquid polymers of butene and/or isobutene, acrylic esters, polyvinyl ethers, liquid resins and plasticizing resins based on the raw materials for tackifier resins, wool wax and other waxes, or liquid silicones.

Examples of crosslinking agents are phenolic resins or halogenated phenolic resins, melamine resins and formaldehyde resins. Suitable crosslinking promoters are, for example, maleimides, allyl esters such as triallyl cyanurate, and polyfunctional esters of acrylic and methacrylic acid.

A preferred embodiment comprises pressure-sensitive adhesives formed from pale and transparent base materials. Particular preference is given to acrylate PSAs (in dispersion form, for example) or PSAs formed from styrene block copolymer and resin (of the type customary for hot melt PSAs, for example).

The thickness of coating of adhesive is preferably in the range from 18 to 50, more particularly 22 to 29 $g/m^2$. The width of the adhesive tape roll is preferably in the range from 2 to 60 mm.

The adhesive tape of the invention is suitable, for example, for packaging applications such as reinforcement of cardboard packaging, particularly in the area of die cuts, as tear-open strips, as a carry handle, for pallet securement or for bundling.

Test Methods
Thickness: DIN 53370
This is the thickness of the carrier without adhesive.
Tensile strength: DIN 53455-7-5 in longitudinal direction
Stress at 1% or 10% elongation: DIN 53455-7-5 in longitudinal direction
Elongation at break: DIN 53455-7-5 in longitudinal direction
Tensile impact toughness in transverse direction: DIN EN ISO 8256:2004
(Specimen type 3, clamped length 30 mm, 7.5 J pendulum, 1 ply, 30 g yoke)
Tear propagation resistance in transverse direction: DIN 53363-2003-10

Failure Criterion

The films can be categorized in terms of their failure mode, which can likewise be employed as a quality criterion for the tear propagation resistance.
1. The tear in the sample propagates simply in transverse direction until the specimen fails by fracture. This is regarded as the least favorable scenario for the assessment of the tear propagation resistance.
2. The tear in the sample initially propagates in longitudinal direction until the clamps are reached, at which point the sample tears transversely to the direction of testing when the tensile strength is reached. This tear behavior is an indicator of high tear propagation resistance on the part of the film.
3. The tear in the specimen initially propagates in longitudinal direction until it reaches the clamps, at which point the specimen tears with splitting in longitudinal direction, when the tensile strength is reached, into numerous individual fibers, which then ultimately tear in transverse direction. This tear behavior is an indicator of a particularly high tear propagation resistance on the part of the film.

Melt Index: DIN 53735
The Melt Flow Ratio (MFR) melt index is measured in accordance with DIN 53735. For polyethylenes, melt indices are usually reported in g/10 min at 190° C. under a weight of 2.16 kg, and for polypropylenes similarly but at a temperature of 230° C.
Flexural modulus: ASTM D 790 A
Technical adhesive data: AFERA 4001, corresponding to DIN EN 1939
Transparency: visual The purpose of the text below is to illustrate the invention by reference to examples, without restricting it by means of these examples.

EXAMPLES

Raw Materials

Dow 7C06:
PP impact copolymer, MFI 1.5 g/10 min, non-nucleated, flexural modulus 1280 MPa (Dow Chemical)
TI-4007-G:
PP impact copolymer, MFI 0.7 g/10 min, non-nucleated, flexural modulus 1200 MPa (Sunoco Chemicals)
Inspire D 404.01:
PP copolymer, MFI 3 g/10 min, flexural modulus 2068 MPa, nucleated (reportedly corresponding to US 2003/195300 A1), crystallite melting point 164° C. (Dow Chemical)

Xmod GA265Z:

20% by weight sized short glass fibers (ø=12 μm, L=250 μm) in polypropylene, MFI 0.3 g/10 min, non-nucleated, flexural modulus 3200 MPa (Borealis)

RTP 100AR15:

15% by weight aramid fibers (ø=16 μm, L=300 μm) in polypropylene, flexural modulus 2760 MPa, non-nucleated (RTP Company)

Nyloy PC-0020N:

20% by weight carbon fibers (ø=9 μm, L=250 μm) in polypropylene, non-nucleated, flexural modulus 8140 MPa (Nytex Composites)

ø=average fiber diameter. L=average fiber length

Example 1

A single-layer film is produced in one layer on a single-screw extrusion unit with a flat die having a flexible die lip, followed by a chill roll station and a single-stage short-gap orienting unit. Raw materials used are Inspire D 404.01 and Xmod GA265Z in a mixing ratio of 4:1. The die temperature is 230° C. Chill roll temperatures and drawing roll temperatures are set such as to maximize the crystallinity of the film before and after the drawing operation. The draw ratio is 1:8.6.

Film Properties:

| | |
|---|---|
| Carrier thickness after orientation | 80 μm |
| Stress at 1% elongation | 51 N/mm² |
| Stress at 10% elongation | 326 N/mm² |
| Tensile strength | 343 N/mm² |
| Elongation at break | 11% |
| Tear propagation resistance | 3520 N/mm |
| Failure criterion | 3. |
| Tensile impact toughness, transverse | 437 kJ/m² |
| Transparency | slightly hazy, colorless, fibers virtually invisible* |

*Slightly hazy means that text in typical typewriter size can be read through the film.

The film is corona-pretreated on both sides, coated on the top face with a 0.5% strength solution of PVSC in toluene, as a release, and dried. The adhesive is mixed in the melt from 42% by weight of SIS elastomer, 20% by weight of pentaerythritol ester of hydrogenated rosin, 37% by weight of a $C_5$ hydrocarbon resin having an R&B value of 85° C., and 1% by weight of Irganox® 1010 antioxidant, and the mixture is applied with a nozzle at 150° C. to the bottom face of the film. The adhesive tape is then wound to form a stock roll and for further testing is slit to a width of 15 mm.

Technical Adhesive Data:

Bond strength to steel 2.9 N/cm

Unwind force at 0.3 m/min 1.0 N/cm

Coat weight 30 g/m².

Example 2

The film is produced in the same way as in example 1. Raw materials used are TI4007-G and RTP 100AR15 in a mixing ratio of 3:1. The draw ratio is 1:8.

Film Properties:

| | |
|---|---|
| Carrier thickness after orientation | 80 μm |
| Stress at 1% elongation | 44 N/mm² |
| Stress at 10% elongation | 301 N/mm² |
| Tensile strength | 340 N/mm² |
| Elongation at break | 12.5% |
| Tear propagation resistance | 3670 N/mm |
| Failure criterion | 3 |
| Tensile impact toughness, transverse | 384 kJ/m² |
| Transparency | slightly hazy, colorless, fibers virtually invisible |

The film is corona-pretreated on one side, coated with Primal® PS 83 B (Rohm & Haas), and dried. The adhesive tape is then wound to form a stock roll and for further testing is slit to a width of 15 mm.

Technical Adhesive Data:

Bond strength to steel 2.6 N/cm

Unwind force at 0.3 m/min 1.1 N/cm

Coat weight 25 g/m².

Example 3

Dow 7C06 and Nyloy PC-0020N are mixed in a ratio of 3:1 and compounded on a twin-screw extruder with an L/D ratio of 36. The compounded formulation which results is processed further in the same way as in example 1. The draw ratio is 1:10.

Film Properties:

| | |
|---|---|
| Carrier thickness after orientation | 110 μm |
| Stress at 1% elongation | 42.6 N/mm² |
| Stress at 10% elongation | 283 N/mm² |
| Tensile strength | 368 N/mm² |
| Elongation at break | 14.8% |
| Tear propagation resistance | 3450 N/mm |
| Failure criterion | 3 |
| Tensile impact toughness, transverse | 290 kJ/mm |
| Transparency | slightly hazy, grayish, fiber agglomerates visible |

Comparative Example 1

Single-Layer Film

A singe-layer strapping-grade film is produced from Moplen EPQ 30 RF with a draw ratio of 1:8. Processing to an adhesive tape takes place in the same way as in example 1 of EP 1 101 808 A2.

Test Results:

| | |
|---|---|
| Thickness after orientation | 85 μm |
| Tensile strength, longitudinal | 290 N/mm² |
| Stress at 10% elongation, longitudinal | 169 N/mm² |
| Tear propagation resistance | 90 N/mm |
| Elongation at break | 35% |

Comparative Example 2

Two-Layer Film

In DE 36 40 861 A1, example 1 has the greatest tensile strength and tension at 10% elongation, longitudinal. The draw ratio is 1:7.5.

Test Results:

| | |
|---|---|
| Thickness after orientation | 85 μm |
| Tensile strength, longitudinal | 215 N/mm² |
| Stress at 10% elongation, longitudinal | 104 N/mm² |
| Tear propagation resistance | 112 N/mm |
| Elongation at break | 40% |

Comparative Example 3

Filament Adhesive Tape

Properties of a commercially customary filament adhesive tape, a polypropylene carrier with glass fiber reinforcement (for example, 3M Scotch 8981):

| | |
|---|---|
| Thickness without layer of adhesive | 135 μm |
| Tensile strength, longitudinal | 448 N/mm² |
| Stress at 10% elongation, longitudinal | max. elongation at 5.5% |
| Tear propagation resistance | 1640 N/mm |
| Elongation at break | 5.5% |

Comparative Example 5

Film with Coextruded Filament

In EP 1 101 808 A1, example 1 has the greatest tensile strength and tension at 10% elongation, longitudinal. The draw ratio is 1:8.7.

Test Results:

| | |
|---|---|
| Thickness after orientation | 77 μm |
| Tensile strength, longitudinal | 231 N/mm² |
| Stress at 10% elongation, longitudinal | 147 N/mm² |
| Tear propagation resistance | |
| Elongation at break | 34% |

The invention claimed is:

1. A film for an adhesive tape, comprising at least one homopolymer, copolymer or terpolymer of propylene and fibers, wherein the film is oriented monoaxially in longitudinal direction, the draw ratio being at least 1:8, wherein the film exhibits the following:
   a tensile strength in longitudinal direction of at least 300 N/mm²; a stress at 1% elongation of at least 20 N/mm² in a longitudinal direction; a stress at 10% elongation of at least 170 N/mm² in a longitudinal direction; and a tear propagation resistance of at least 1700 N/mm in a transverse direction.

2. The film according to claim 1, wherein the fibers are selected from the group consisting of hemp, sisal, flax, banana, coconut, pineapple, aramid, polyarylate, glass, silicon carbide, aluminum silicate, basalt, carbon E-glass and textile glass.

3. The film according to claim 1, wherein the fibers have a length of at least 100 μm.

4. The film according to claim 1, wherein the film comprises 0.5% to 10% by weight of fibers.

5. The film according to claim 1 wherein the film has a thickness of 25 to 200 μm.

6. The film according to claim 1 wherein the film comprises a polypropylene base material having a melt index of 0.3 to 15 g/10 min and having a flexural modulus of at least 1000 MPa.

7. The film according to claim 1 wherein the film, on at least one of the two outer sides, has a coextrusion layer comprising a polypropylene polymer or an ethylene-containing polymer having a crystallite melting point of below 150° C.

8. The film according to claim 1 wherein the film comprises at least one nucleating agent.

9. A method for producing a film according to claim 1 comprising following steps:
   mixing the polypropylene with the fibers in an extruder,
   granulating the compounded formulation,
   melting the compounded formulation in an extruder,
   discharging and shaping the melt by means of a die,
   cooling the melt to form a film by the cast film extrusion process,
   heating the film to a suitable drawing temperature by means of heated rolls,
   orienting the film in a short gap in longitudinal direction,
   carrying out coating with pressure-sensitive adhesive, unless a layer of pressure-sensitive adhesive has already been applied in the extrusion process,
   converting to form rolls.

10. The film according to claim 3 wherein the fibers have an average fiber diameter of between about 4 to 30 μm.

* * * * *